INVENTORS
KENNETH L. EBERSHOFF
KENNETH H. MILLER

INVENTORS
KENNETH L. EBERSHOFF
KENNETH H. MILLER
BY Thomas G. Harwood

United States Patent Office 3,443,106
Patented May 6, 1969

3,443,106
RADIATION SENSITIVE POWER CONTROL SYSTEM
Kenneth L. Ebershoff, Phoenix, Ariz., and Kenneth H. Miller, Austin, Tex., assignors to Davis Electronics Corporation, Austin, Tex., a corporation of Texas
Filed Feb. 13, 1964, Ser. No. 344,690
Int. Cl. H01j 39/12; H02b 1/24; H01h 35/00
U.S. Cl. 250—214                    12 Claims

ABSTRACT OF THE DISCLOSURE

This invention relates to a system for controlling the electrical power delivered to a load, and more particularly to a system for controlling the power responsive to light incident on a photosensitive device. A semiconductor controlled rectifier is connected to an AC voltage source and the load, and control means are connected to the controlled rectifier for generating a gate signal at controlled times during each half cycle of the AC voltage supply to cause power to be supplied to the load, which control means includes a photosensitive device whose impedance varies as a function of light incident thereon.

---

Among the objects of the present invention is the provision of a system for controlling the amount of power to incandescent lamps in which the lamps are automatically turned on at night and automatically turned off during the day. Thus the system supplies more electrical power to the incandescent lamps during the darker hours of the day than during the daylight period. Moreover, in order to preserve the lifetime of the incandescent lamp filaments, the system operates to turn on the lamps gradually to prevent a high in rush current surge into the filaments when they are cold. The system comprises a circuit utilizing at least one controlled rectifier device for controllably supplying different amounts of electrical energy from an alternating current supply to the incandescent lamp. The controlled rectifier is connected in series with the incandescent lamp and is characterized by a high impedance between its conduction terminals until it is triggered to a low impedance condition by a control pulse. The circuit of the invention includes a control circuit for triggering the controlled rectifier from its high to its low impedance state at controlled times during the half cycles of the alternating line source. Firing the controlled rectifier at an earlier time during each half cycle causes more power to be delivered to the incandescent lamp load, and vice-versa, thus providing means for controllably supplying varying amounts of power to the incandescent lamp.

The control circuit is characterized by the inclusion of a photosensitive device whereby the time during the half cycles of the alternating line source at which the triggering pulse is generated to fire the controlled rectifier is determined by the amount of incident light on the photosensitive device. In the above noted system for automatically controlling the amount of electrical energy supplied to the incandescent lamps, the photocell is exposed to natural daylight in order to provide the automatic control.

The system of this invention is also useful for providing variable control to incandescent lamps in response to the manual operation of the control circuit. In this instance, the photosensitive device is enclosed within a box to prevent any outside light from striking thereon. A lamp or light source is also enclosed within the box to illuminate the photosensitive device. The intensity of light by which the photosensitive device is illuminated is controlled by an auxiliary power source which may be manually operated. In this manner, the system of this invention is applicable to intensity control of stage lighting, for example.

It can readily be seen that complete electrical isolation is achieved in this case because of the optical coupling between the control unit and power control circuits. This is very advantageous in stage lighting control where several power control circuits are used, since the possibility of electrical shorting between two "hot" leads is eliminated. Moreover, the stage hand operating the lighting control console is completely electrically isolated from the high voltage circuitry.

It is, therefore, a broad object of this invention to provide a power control source for incandescent lamps in which the amount of power supplied to the lamps is a function of the amount of incident light on a photosensitive device within the system.

The systems for controlling the intensity of outside lamps are subject to weather elements such as lightning which can produce large voltage transients in the line source which could damage the system. In one aspect of the invention there is provided means in conjunction with the control circuitry for protecting the devices within the circuit from excessively large voltage transients and, thus, it is an object to provide such means for protection. Characteristically, the semiconductor devices are the particular devices to be protected.

Other objects, features and advantages of the invention will become apparent from the following detailed description when taken in conjunction with the appended claims and the attached drawing in which like reference numerals refer to like parts throughout the several figures, and in which:

Figure 1:
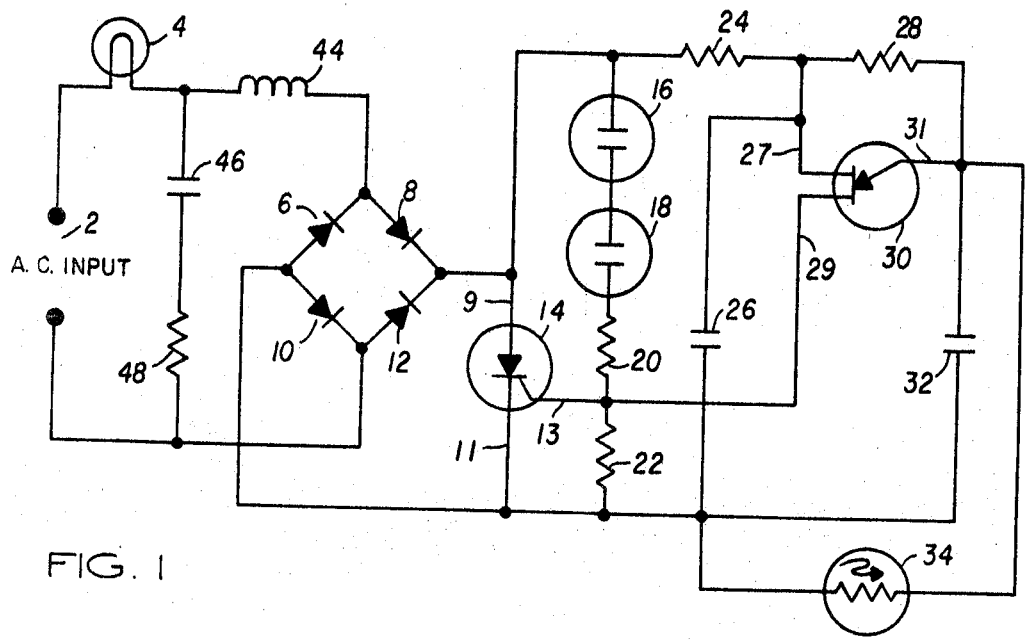
FIGURE 1 is an electrical schematic diagram of one system of the invention for providing automatic control of power to an incandescent lamp inversely as a function of the incident light on a photosensitive element.

A system for automatically varying the intensity of lights as an inverse function of the amount of daylight present is shown in FIGURE 1. The system comprises a line source 2, which is normally a 110 or 220 volt, 60 cycle input, and an incandescent lamp 4 or parallel bank of lamps connected in series therewith. A controlled rectifier 14 is connected in series with the source voltage and the incandescent lamp through a full wave bridge comprised of rectifiers or diodes 6, 8, 10 and 12. A circuit for selectively firing the controlled rectifier during each half cycle of the source voltage is provided and will be presently explained. When the rectifier is fired by the application to its control electrode of a signal for changing the rectifier from a high impedance to a low impedance state, the current path from the source voltage for supplying power to the incandescent lamp is through the lamp, one arm of the full wave rectifier bridge, the controlled rectifier, and back to the source voltage through another arm of the rectifier bridge. The controlled rectifier changes from a high impedance to a low impedance state over a very short time interval when the firing signal is applied to its control electrode, and as a result, short duration, high frequency transients are created in the line source.

Thus, a filter circuit is provided across the line source and comprises an rf choke 44 in series with the line source and capacitor 46 and resistor 48 connected across the line source. The choke 44 acts as a very high impedance to any high frequency signal and cooperates with the capacitor 46 and resistor 48 for filtering the rf transients and preventing them from being transferred along the input power lines.

The controlled rectifier 14 preferably comprises a four layer silicon controlled rectifier having conduction electrodes 9 and 11, and an intermediate control electrode 13. Devices of this type are well known in the art and are characterized by a normally high impedance state with no control signal applied to the electrode 13, and by very low impedance state when an appropriate signal is applied to the control electrode. When a positive pulse is applied to the control electrode 13, the device is rendered conductive and is characterized by a very low impedance between the conduction electrodes 9 and 11, and once the device attains what is known as its "holding current" through the conduction electrodes, the device will continue in its low impedance state without the application of a control signal to the control electrode until the current magnitude drops below the "holding current," at which time it will return to its high impedance state.

The firing circuit for the controlled rectifier includes a unijunction relaxation oscillator for providing a triggering pulse to the control electrode 13 during each half cycle of the A.C. input from the line source, with means for selecting the time during the half cycle in which the firing pulse is applied to the rectifier. Thus the controlled rectifier may be fired earlier or later in the half cycle to vary the amount of power delivered to the incandescent lamp 4. As stated in conjunction with the operation of the controlled rectifier, once the rectifier is fired, it continues to conduct without a control signal applied thereto. The rectifier is cut off and changed back to its high impedance state only by the reduction of the voltage across its conduction electrodes to an amount where the holding current of the device is no longer flowing. Thus, during the positive half cycle of the source input, for example, conduction electrode 9 will be positive with respect to conduction electrode 11, and the triggering pulse to the control electrode 13 will render the device conductive. Upon the termination of the positive half cycle of the source voltage, the conduction electrode 9 is no longer positive with respect to electrode 11, and there is an insufficient voltage thereacross to maintain the rectifier in its low impedance state, at which time the rectifier is cut off. During the negative half cycle of the source voltage, the conduction electrode 9 is again made positive with respect to the conduction electrode 11 because of the full wave rectifier bridge. The same triggering and conduction action is repeated through the controlled rectifier. Thus full wave power control to the incandescent lamp 4 is achieved.

The unijunction relaxation oscillator for providing the triggering pulse to the conduction electrode 13 of the controlled rectifier comprises a unijunction device 30 having first and second bases 27 and 29, respectively, and an emitter electrode 31. This device is well known in the art and is characterized by a normally high impedance between the bases 27 and 29, and a normally high impedance between each of the bases and the emitter electrode when no bias is applied between the emitter and the base electrodes. The relaxation oscillator comprises a capacitor 32 and a resistor 28 connected in series with the line source for charging the capacitor 32. The unijunction device is connected across the capacitor 32 in series with a resistance 22, the base electrode 29 of the unijunction capacitor being connected to both the resistor 22 and the control electrode 13 of the controlled rectifier The relaxation oscillator is connected in series with the line source by means of current-limiting resistor 24. When the controlled rectifier is not conducting, current passes through resistors 24 and 28 and charges capacitor 32 until the voltage thereon has attained a value sufficient to force the unijunction device to a low impedance state through the emitter 31 and base electrode 29. As a low impedance path is provided between base electrode 29 and emitter 31 as a result of the voltage on capacitor 32, the capacitor is rapidly discharged through the control electrode 13 of the controlled rectifier to provide a firing pulse. The controlled rectifier is then triggered to a low impedance state, and during the remainder of the half cycle of the line source, the controlled rectifier shunts the firing circuit to prevent repetitive firing of the relaxation oscillator and supplies power to the incandescent lamp 4. During this conductive portion of the cycle, the incandescent lamp 4 comprises essentially all of the impedance of the circuit. The resistor 22 is used to prevent leakage current through bases 27 and 29 of the unijunction device from triggering the controlled rectifier at undesirable times, and also insures that almost all of the current from capacitor 32 flows through the control electrode 13. The capacitor 26 filters any line transients to prevent preignition or premature firing of the unijunction device.

It can be seen that the occurrence of the firing pulse from the relaxation oscillator during different times in each half cycle will be effective to provide different amounts of power to the incandescent lamp. That is to say, more power will be delivered to the lamp when the firing pulse occurs earlier in the half cycle, and proportionately less power will be supplied to the lamp when the firing pulse occurs later in the cycle. Thus, means for controlling the time of occurrence of the firing pulse is important in the controlled delivery of power to the load.

The invention provides, in conjunction with the above described circuitry, a photosensitive device 34 connected across the capacitor 32 to vary the time during the half cycle in which the triggering pulse is generated. Preferably, the photosensitive device constitutes a photocell, such as those made from cadmium sulfide, which is well known in the art. Such a device is characterized by a high impedance between its conduction terminals when only a small amount or no amount of light is incident thereon, and by a proportionately lower impedance as the incident light intensity increases. Thus the device is no more than a resistor, the impedance of which varies as a function of the incident light thereon. When the device is connected across the capacitor 32 as shown, and is exposed to daylight, for example, which would constitute a relatively large amount of incident light, the impedance thereof is very low, and a shunting path between the emitter 31 and base 29 of the unijunction device is provided. Because of the shunting effect, a longer portion of the half cycle is required to charge the capacitor 32, and thus, the triggering pulse through the unijunction device occurs later in the cycle. As less light is incident on the photocell 34, the impedance thereof increases, and the effect of the shunting path becomes less. It can be seen that the time required to charge the capacitor 32 to the required voltage for producing the triggering pulse is dependent upon the amount of incident light on the photocell 34.

The invention as just described provides a system for automatically turning street lights on and off, for example, according to the amount of daylight present. During the transition from daylight to darkness, the amount of power supplied to the street lights is proportionately increased to provide the required amount of light. Because of the gradual transition of power supplied to the lights, they are turned on very slowly and are at no time subjected to a high transient or inrush surge of current. This greatly increases the life of the filament within the incandescent lights.

Since street lights are connected to outside line sources in which high voltage transients may be present as a result of power switching and lightning striking the lines, means are provided in the circuit of FIGURE 1 for protecting the devices incorporated therein. To prevent damage to the devices, a pair of voltage breakdown devices 16 and 18 are connected across the conduction electrode 9 and control electrode 13 of the controlled rectifier 14. The breakdown devices are characterized by little or no current passage therethrough for applied voltages up to their breakdown voltage. When the breakdown voltage is exceeded, the device is then characterized by an impedance change thereacross with a lower impedance to current flow. A pair of neon bulbs are shown in the circuit of FIGURE 1 at 16 and 18, respectively, and are characterized by little or no current flow up to their breakdown voltage. As the breakdown voltage is exceeded, the neon bulbs exhibit an impedance drop. Two neon bulbs are used in this circuit in order to provide the proper voltage drop prior to breakdown, although a single device will do the job if its breakdown voltage is sufficient. Assuming a high voltage transient occurs in the line, it will be imposed across both the controlled rectifier 14 and the neon bulbs 16 and 18. However, when the transient voltage attains the breakdown voltage of the neon bulbs, they will break down and the voltage due to the high transient is applied through limiting resistor 20 to the control electrode 13 of the rectifier 14, causing it to go into its low impedance conduction state. This, in turn, causes essentially the entire voltage transient to be applied across the incandescent lamp 4, which converts the voltage transient to a current transient. Since the controlled rectifier can withstand the current transient without being damaged, and since the incandescent lamp is not damaged by the short duration of the high voltage transient, the devices of the circuit are protected, in addition to which the rectifier bridge is protected. As an alternate device to the neon bulbs, Zener diodes of proper electrical characteristics can be used and are characterized by little or no current flow therethrough up to its breakdown voltage, at which time, the voltage thereacross remains essentially constant, and the current varies accordingly. This device will also serve the same purpose as the neon bulbs previously explained if the parameters thereof are chosen properly.

Figure 2:
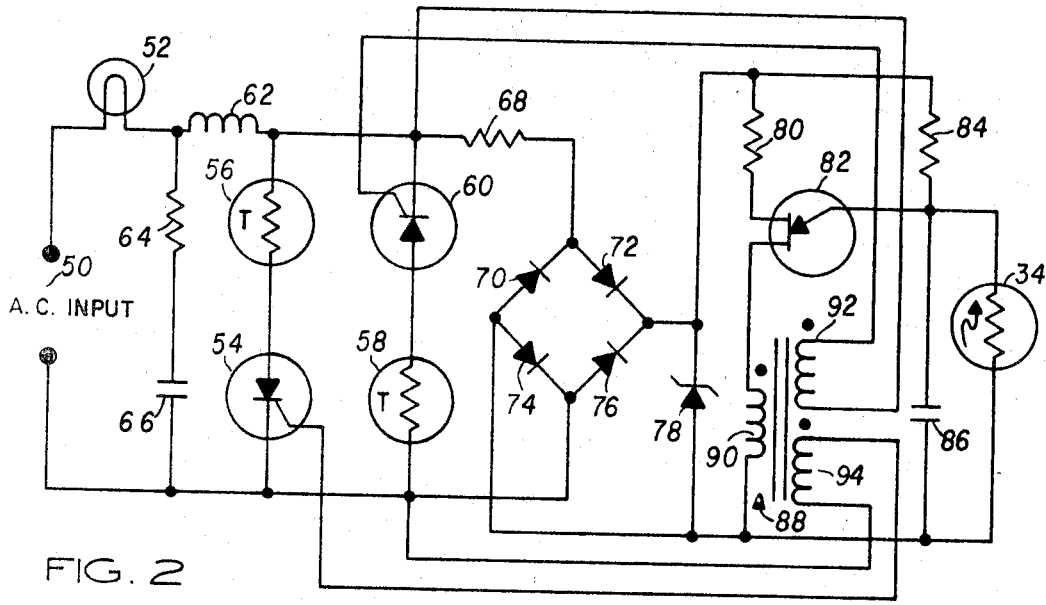
FIGURE 2 is an electrical schematic diagram of another system for providing automatic control of power to an incandescent lamps.

A circuit including two controlled rectifiers for controlling power to the incandescent lamp is shown in FIGURE 2 and is similar to the circuit previously described. This circuit is primarily useful for delivering power in excess of 300 watts to the incandescent lamp 52, which is connected in series with the line source 50. Such a circuit can be used for turning lights on and off in apartment houses, on billboards and the like, where larger power requirements are present, and since the circuit will be used in locations not considered so vulnerable to lightning surges, such as the street lamp circuit previously described, the voltage protection portion of the circuit is not included herein, although it should be understood that such a feature could be incorporated. The circuit comprises one or more incandescent lamps 52 connected in series with line source 50 with a filter circuit comprised of the RF choke 62, resistor 64 and RF capacitor 66, connected as previously described. Two controlled rectifiers 54 and 60 are used in this circuit rather than a single device for purposes to be described hereinafter. Here, the rectifiers are connected directly across the line source in series with the incandescent light 52, the two controlled rectifiers being connected in opposite polarities. Thermistors 56 and 58 are connected in series with controlled rectifiers 54 and 60, respectively, for limiting inrush current surges as will be described. A full wave rectifier bridge comprised of diodes 70, 72, 74 and 76 is connected in series with the incandescent light and in parallel with the controlled rectifiers through limiting resistor 68. A unijunction relaxation oscillator similar to that previously described is connected to the other side of the bridge as shown and comprises a unijunction device 82, connected in series with a limiting resistor 80 and the primary 90 of a transformer 88. One terminal of the resistor 80 is connected to one side of the full wave bridge, and one side of the primary 90 is connected to the other side of the bridge, as shown. A resistance-capacitance charging path, comprised of resistor 84 and capacitor 86, is connected in parallel with the unijunction and transformer circuit to provide the biasing potential to the emitter of the unijunction device by connection of the emitter to the interconnection of the resistor and capacitor. A photocell 34 is connected to shunt the capacitor 86 to provide the same type of action as described with reference to FIGURE 1. As the capacitor 86 charges to a sufficient value to cause conduction through the unijunction device, the capacitor is discharged through the unijunction device and the primary 90 of the transformer 88, thus producing an induced voltage in each of the secondary windings 92 and 94. During the half cycle of the source input when the polarity at resistor 68 is positive, a voltage induced in the secondary 94 will cause the controlled rectifier 54 to be triggered to its low impedance state, thus shunting the entire circuit in transferring power to the incandescent lamp 52. During this half cycle, the other controlled rectifier 60 will be maintained in its high impedance state because of the negative polarity on its positive conduction electrode. Similarly, the controlled rectifier 60 will be triggered to its low impedance state during the other half cycle.

In this embodiment, the controlled rectifiers are connected across the source lines in series with the incandescent lamps preceding the full wave rectifier bridge, thus obviating the necessity of bridge diodes having high power rating. The limiting resistor 68 maintains a current flowing through the diodes within the full wave bridge below their maximum rated value. In this manner, none of the circuitry to the right of the resistor 68 is required to handle large powers, and only the controlled rectifiers are subject to the high power requirements. Because of this, two controlled rectifiers are required rather than the single device shown in FIGURE 1. The thermistors 56 and 58 protect the controlled rectifiers at night when a power failure is experienced and a subsequent and rapid return of line power occurs.

Figure 3:
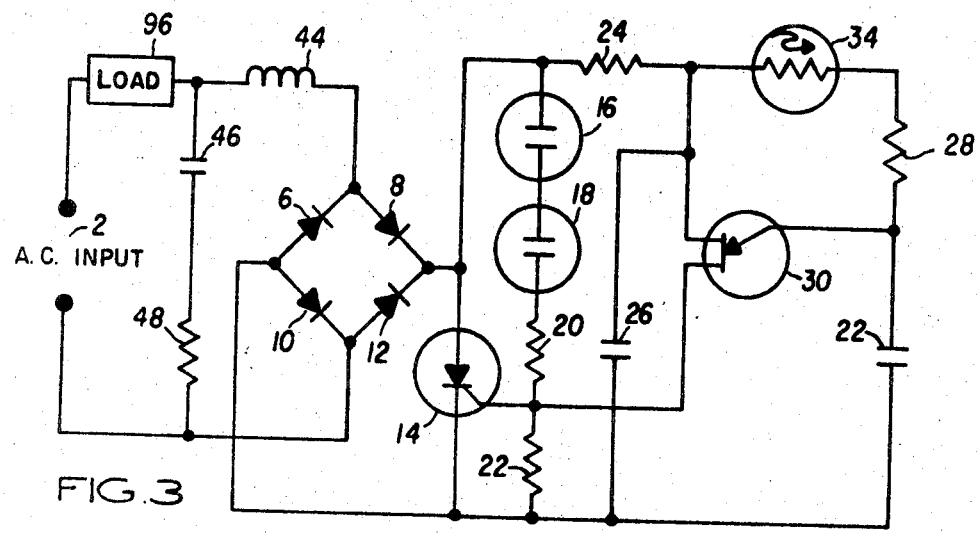
FIGURE 3 is an electrical schematic diagram of a system for providing automatic power control to a load or lamp directly as a function of the amount of light incident on a photosensitive element.

The circuits of FIGURE 1 and FIGURE 2 operate to provide more power to the incandescent bulbs when less light is incident on the photocells, and less power when more light is incident thereon. This is desirable for those applications where lights are to be automatically turned on at night and turned off during the day. However, other applications necessitate an increase of power to a load during the daytime, and a decrease or termination of power to a load during night. For example, a rearrangement of the circuit of FIGURE 1 can be effected to supply electrical energy to an automatic coffee pot during the morning, as enough light is incident on the photocell, or any other similar application. The circuit of FIGURE 3 provides this reverse action and is identical to the circuit of FIGURE 1 with the exception of the connection of the photocell 34. Here, the photocell is connected in series with the resistor 28 so that instead of shunting the capacitor 32, the photocell is now in series therewith. As more light is incident on the photocell 34, its impedance between its conduction terminals decreases and the capacitor 32 charges to the triggering voltage sooner in the half cycle. Conversely, less incident light on the photocell causes its impedance to increase, thus delaying the charge on capacitor 32. In the former case, more power is supplied to the load 96 during daylight, and in the latter case, less power supplied to the load during nighttime.

Figure 4:
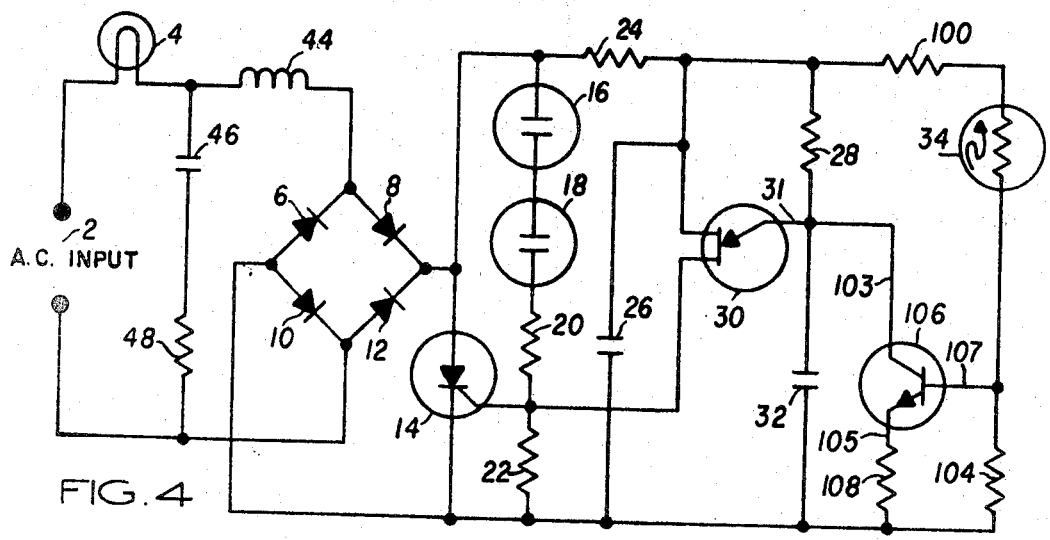
FIGURE 4 is an electrical schematic diagram of a system similar to FIGURE 1 but with increased sensitivity of control.

The circuit of FIGURE 1 can also be provided with an increased sensitivity to respond to smaller variations of incident light on the photocell 34. Such a circuit is shown in FIGURE 4 and is quite similar to that of FIGURE 1, except that a transistor 106 is connected between the circuit containing the photocell and the emitter of the unijunction device 30. A transistor 106 is connected to shunt the capacitor 32 with the collector 103 of the transistor connected to one side of the capacitor 32 and the emitter 105 connected to the other side of the capacitor through bias resistor 108. The photocell 34 is connected at one terminal to the base 107 of the transistor 106 and at its other terminal to resistor 28 through limiting resistor 100. A bias resistor 104 is provided between the base of the transistor and said other side of the capacitor 32. As more light is incident on the photocell 34, its impedance decreases and the potential applied to the base 107 of the transistor is increased, thus causing an increased conduction through the transistor collector-emitter circuit. This, in turn, produces a shunting effect across the capacitor 32, causing it to attain its required voltage during a later portion of the half cycle of the line source. Conversely, less incident light on photocell 34 causes proportionately less current conduction through the transistor and permits the capacitor 32 to attain its voltage during an earlier portion of the half cycle. The transistor amplifies the base signal applied thereto and, thus, an increased sensitivity to incident light is achieved to control the time during the half cycle at which the capacitor reaches the required voltage. Thus greater changes in power supplied to the lamp 4 can be effected with proportionately smaller changes in incident light on photocell 34.

Figure 5:
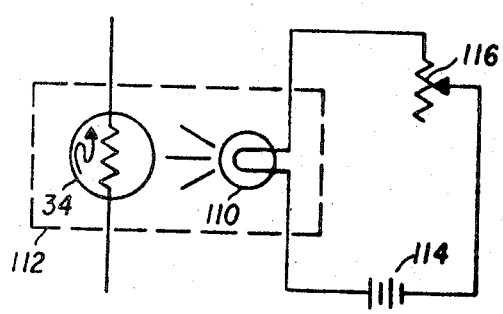
FIGURE 5 is an electrical schematic diagram of a portion of a control circuit including the photosensitive device of FIGURE 1 for manual control of the amount of power delivered to an incandescent lamp.

The circuits of FIGURES 1–4 have been described primarily for application to automatic power control circuits responding to natural light incident on the photocell. However, the circuits can be adapted to manual power control for such applications as stage lighting, for example. In the stage lighting application, it is highly desirable to provide complete electrical isolation between the control unit and the high voltage power circuits as noted earlier. To provide this complete electrical isolation and at the same time achieve the advantage of being able to control large amounts of power by means of a control circuit that utilizes only a very small amount of power, the photocell 34 is enclosed within a box 112 as shown in FIGURE 5. A light source 110, such as an incandescent lamp, is also enclosed within the box to provide illumination of the photocell. By enclosing the two devices within the box, the photocell is exposed only to the light from the lamp. The photocell 34 is connected in any one of the four circuits as previously described, and the lamp 110 is connected to a small D.C. power supply 114, such as a battery, through a potentiometer or variable resistor 116. The stage lighting control operator adjusts the variable resistor 116 to achieve the desired amount of light output from the lamp 110, and the impedance of the photocell 34 varies inversely as a function of the incident light. Thus the power delivered to the stage lighting lamps is controlled accordingly, and it can be readily seen that the two objectives are met, namely, controlling large amounts of power by a control circuit utilizing a very small amount of power, and complete electrical isolation between the control unit including the lamp 110 and the high power circuit.

Although the invention has been described with reference to specific embodiments thereof, certain modifications and substitutions that do not depart from the true scope of the invention will undoubtedly become apparent to those skilled in the art, and it is intended that the invention be limited only as defined in the appended claims.

What is claimed is:

1. A system for controlling the amount of electrical power delivered to a load from an alternating voltage supply connected to said load, comprising:
   (a) a switching device having a pair of conduction electrodes for being coupled to said alternating voltage supply and said load and having a control electrode,
   (b) said switching device exhibiting a normally high impedance between said conduction electrodes and capable of being switched to a low impedance condition therebetween responsive to a control signal applied to said control electrode,
   (c) signal means connected to said control electrode and having an input terminal for generating said control signal when a predetermined minimum voltage is applied to said input terminal,
   (d) an impedance circuit connected to said input terminal and for being coupled to said voltage supply and comprising a plurality of impedance means for applying said predetermined minimum voltage to said input terminal at least once during each cycle of said supply voltage at a time which is a function of the relative magnitudes of said plurality of impedance means, and
   (e) at least one of said plurality of impedance means comprising a photosensitive device whose impedance varies as a function of light incident thereon.

2. A system according to claim 1 wherein said signal means includes a capacitor connected to said input terminal for being charged to said predetermined minimum voltage.

3. A system according to claim 2 wherein said photosensitive device is connected in parallel with said capacitor.

4. A system according to claim 2 wherein said photosensitive device is connected in series with said capacitor and said voltage supply.

5. A system according to claim 1 including a source of light optically coupled to said photosensitive device, and means for controlling the amount of light from said source incident on said photosensitive device.

6. A system according to claim 5 wherein said means for controlling the amount of light incident on said photosensitive device includes an opaque enclosure about said photosensitive device and said source of light.

7. A system according to claim 2 wherein said signal means comprises a relaxation oscillator.

8. A system for controlling the amount of electrical power delivered to a load from an alternating voltage supply connected to said load, comprising:
   (a) a switching device having an anode, a cathode and a control electrode,
   (b) said switching device exhibiting a normally high impedance between said anode and said cathode and capable of being switched to a low impedance condition therebetween responsive to a control signal applied to said control electrode in the presence of a positive voltage applied to said anode,
   (c) a full wave rectifier connected to the anode of said switching device and for being coupled to said voltage supply for applying a positive full wave rectified voltage to said anode from said voltage supply,
   (d) signal means connected to said control electrode and having an input terminal for generating said control signal when a predetermined minimum voltage is applied to said input terminal,
   (e) an impedance circuit connected to said input terminal and said anode of said switching device and comprising a plurality of impedance means for applying said predetermined minimum voltage to said input terminal once during each half cycle of said voltage supply at a time which is a function of the relative magnitudes of said plurality of impedance means, and
   (f) at least one of said plurality of impedance means comprising a photosensitive device whose impedance varies as a function of light incident thereon.

9. A system according to claim 8 including voltage limiting means connected between said anode and said control electrode of said switching device for limiting to a maximum the magnitude of voltage than can be applied to said anode.

10. A system according to claim 9 wherein said voltage limiting means comprises a pair of serially connected neon bulbs.

11. A system according to claim 8 including amplification means connected between said input terminal of said signal means and said impedance circuit.

signal means and said impedance circuit.

12. A system for controlling the amount of electrical power delivered to a load from an alternating voltage supply connected to said load, comprising:
  (a) a pair of switching devices each having an anode, a cathode and a control electrode,
  (b) said pair of switching devices connected in parallel between said anode and said cathode and for being connected across said voltage supply in series with said load,
  (c) each of said pair of switching devices exhibiting a normally high impedance between said anode and said cathode and capable of being switched to a low impedance condition therebetween responsive to a control signal applied to said control electrode in the presence of a positive voltage applied to said anode,
  (d) signal means connected to said control electrode of each of said pair of switching devices and having an input terminal for generating said control signal when a predetermined minimum voltage is applied to said input terminal,
  (e) a full wave rectifier connected across the parallel connection of said pair of switching devices for producing a positive full wave rectified voltage responsive to said voltage supply,
  (f) an impedance circuit connected to said input terminal and said full wave rectifier and comprising a plurality of impedance means for applying said predetermined minimum voltage to said input terminal once during each half cycle of said voltage supply at a time which is a function of the relative magnitudes of said plurality of impedance means, and
  (g) at least one of said plurality of impedance means comprising a photosensitive device whose impedance varies as a function of light incident thereon.

References Cited
UNITED STATES PATENTS

| | | | |
|---|---|---|---|
| 2,967,945 | 1/1961 | De Gier | 250—217 |
| 3,176,189 | 3/1965 | Tabet | 250—206 |
| 3,262,046 | 7/1966 | Clarke et al. | |
| 3,265,991 | 8/1966 | Ferguson | 307—88 |

OTHER REFERENCES

Don Zastrow: Electronics; Dec. 6, 1963, pp. 51 to 60.

WALTER STOLWEIN, *Primary Examiner.*

U.S. Cl. X.R.

307—117